United States Patent
Dabbiere et al.

(10) Patent No.: US 9,785,425 B2
(45) Date of Patent: Oct. 10, 2017

(54) MANAGED CLONE APPLICATIONS

(71) Applicant: AirWatch LLC, Atlanta, GA (US)

(72) Inventors: Alan Dabbiere, McLean, VA (US); Erich Peter Stuntebeck, Marietta, GA (US); Kar Fai Tse, Peachtree Corners, GA (US)

(73) Assignee: AirWatch LLC, Atlanta, GA (US)

( * ) Notice: Subject to any disclaimer, the term of this patent is extended or adjusted under 35 U.S.C. 154(b) by 78 days.

(21) Appl. No.: 14/501,888

(22) Filed: Sep. 30, 2014

(65) Prior Publication Data

US 2016/0094538 A1  Mar. 31, 2016

(51) Int. Cl.
G06F 21/00 (2013.01)
G06F 9/445 (2006.01)
G06F 9/44 (2006.01)
H04L 29/06 (2006.01)
G06F 21/57 (2013.01)

(52) U.S. Cl.
CPC .................. *G06F 8/63* (2013.01); *G06F 8/61* (2013.01); *G06F 8/71* (2013.01); *G06F 21/57* (2013.01); *H04L 63/105* (2013.01); *H04L 63/107* (2013.01); *H04L 63/108* (2013.01)

(58) Field of Classification Search
None
See application file for complete search history.

(56) References Cited

U.S. PATENT DOCUMENTS

| 8,510,571 | B1 | 8/2013 | Chang | |
|---|---|---|---|---|
| 8,695,060 | B2 | 4/2014 | Wade | |
| 9,135,418 | B2 | 9/2015 | Wade | |
| 2004/0268361 | A1* | 12/2004 | Schaefer | G06F 9/54 719/310 |
| 2007/0192864 | A1 | 8/2007 | Bryant | |
| 2009/0126017 | A1 | 5/2009 | Chahal | |
| 2010/0205604 | A1* | 8/2010 | Brower | G06F 9/52 718/102 |
| 2011/0082900 | A1 | 4/2011 | Nagpal | |
| 2012/0210443 | A1* | 8/2012 | Blaisdell | G06F 21/12 726/27 |
| 2013/0145366 | A1* | 6/2013 | Newell | G06F 9/45545 718/1 |
| 2014/0040638 | A1* | 2/2014 | Barton | H04L 41/00 713/193 |
| 2014/0109078 | A1* | 4/2014 | Lang | G06F 8/52 717/172 |
| 2014/0187200 | A1* | 7/2014 | Reitter | H04W 4/021 455/410 |
| 2014/0297825 | A1* | 10/2014 | Lang | G06F 21/51 709/223 |
| 2015/0149633 | A1* | 5/2015 | Foti | H04W 4/005 709/226 |

FOREIGN PATENT DOCUMENTS

CA    EP 2725511 A1 *  4/2014  ............ G06F 21/53

* cited by examiner

*Primary Examiner* — Hadi Armouche
*Assistant Examiner* — Andrew Steinle (57) ABSTRACT

Disclosed are various embodiments relating to managed clones of applications. In one embodiment, an application is received. If it is determined that the application should be managed, a managed clone of the application is generated. The managed clone of the application is configured for coexistence along with the application upon a client device under management. The managed clone of the application may then be deployed to the client device under management.

12 Claims, 6 Drawing Sheets

MANAGED CLONE APPLICATIONS

BACKGROUND

For purposes of productivity, enterprises may provide employees access to enterprise data via mobile devices, such as smartphones, laptops, tablets, and so on. For security reasons, mobile device management systems may place various restrictions on applications and data accessed via the mobile devices. However, information technology departments continue to be challenged in ensuring that restricted actions are not performed via unauthorized applications on client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating and deploying managed clones of applications. Device management systems may be instituted by enterprises and other organizations to manage the use of applications on client devices by their employees or associates. Device management systems are configured to enforce various restrictions based upon compliance rules. In some cases, an application may be wrapped or otherwise modified to include code that implements management for that application.

For various reasons, it may be desirable for users to have both the original, unmanaged version of the application and a managed version of the application installed on their client devices. For example, the client device may be used for both personal and work matters. Where the application is an email application, the unmanaged version may be used to access personal email, and the managed version may be used to access enterprise email. Unfortunately, many client device platforms do not allow for multiple installations of the same application.

Various embodiments of the present disclosure facilitate the generation of managed clones of applications that may be installed alongside existing, unmodified versions of applications. In order to create a managed clone, various unique aspects of the application are modified so as to enable coexistence of the managed clone with an original version in the same client device. During the course of this modification, both metadata and binary code for the application may be modified. Further, the application is modified, or wrapped, to facilitate management of the application's features. In the following discussion, a general description of the system and its components is provided, followed by a discussion of the operation of the same.

Figure 1:
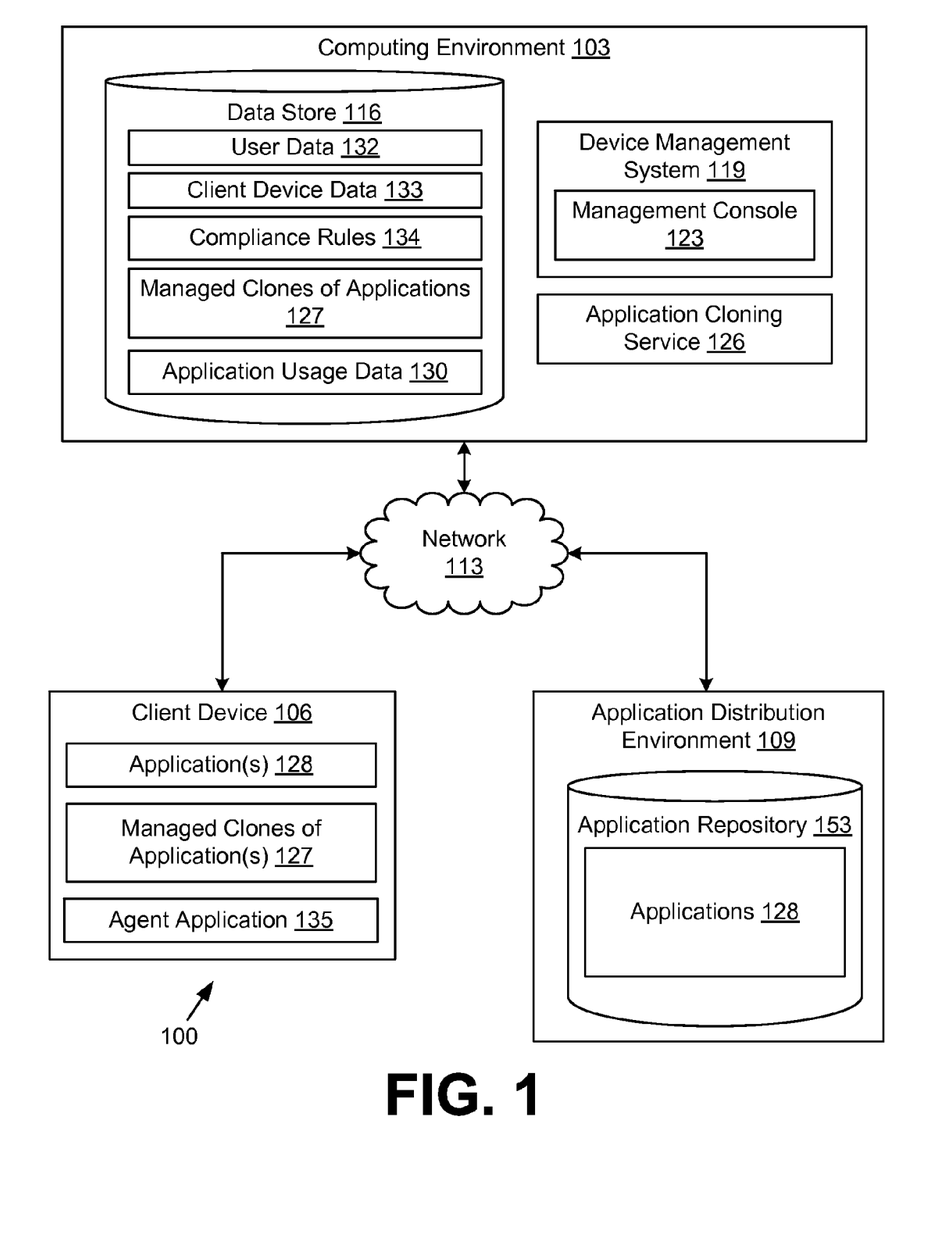
FIG. 1 is a schematic block diagram of a networked environment according to various embodiments of the present disclosure.

With reference to FIG. 1, shown is a networked environment 100 according to various embodiments. The networked environment 100 includes a computing environment 103, a client device 106, and an application distribution environment 109 which are in data communication with each other via a network 113. The network 113 includes, for example, the Internet, one or more intranets, extranets, wide area networks (WANs), local area networks (LANs), wired networks, wireless networks, other suitable networks, or any combination of two or more such networks. For example, such networks 113 may comprise satellite networks, cable networks, Ethernet networks, telephony networks, and other types of networks.

The computing environment 103 may comprise, for example, a server computer or any other system providing computing capability. Alternatively, the computing environment 103 may employ multiple computing devices that may be arranged, for example, in one or more server banks, computer banks, or other arrangements. Such computing devices may be located in a single installation or may be distributed among many different geographical locations. For example, the computing environment 103 may include multiple computing devices that together form a hosted or "cloud" computing resource, a grid computing resource, and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various systems and/or other functionality may be executed in the computing environment 103 according to various embodiments. Also, various data is stored in a data store 116 that is accessible to the computing environment 103. The data store 116 may be representative of a plurality of data stores 116. The data stored in the data store 116, for example, is associated with the operation of the various systems and/or functional entities described below.

A device management system 119 and/or other systems may be executed in the computing environment 103. The device management system 119 may be executed to manage and/or oversee the operation of multiple client devices 106. For example, an employer may operate the device management system 119 to ensure that the client devices 106 of its employees are operating in compliance with various compliance rules. By ensuring that the client devices 106 of its employees are operated in compliance with the compliance rules, the employer may control and protect access to various data. The device management system 119 may also facilitate access to email, calendar data, contact information, documents, or other enterprise data to which an enterprise may wish to provide access by users via client devices 106.

In one embodiment, the device management system 119 may provide a management console 123 and/or other components. The management console 123 may facilitate an administrator's operating and control of the device management system 119. For example, the management console 123 may generate one or more user interfaces that are rendered on a display device (not shown) or accessible via a browser executed by another computing device. Such user interfaces may facilitate entering commands or other information to facilitate configuration of the device management system 119. Specifically, the management console 123 may facilitate configuration of client devices 106 that are enrolled with the device management system 119. Also, the management console 123 may facilitate pushing commands to client devices 106. Additionally, the user interfaces may render presentations of statistics or other information regarding the client devices 106 that are managed by the device management system 119.

The computing environment 103 may also execute an application cloning service 126 that is configured to generate managed clones of applications 127 from applications 128. Specifically, the application cloning service 126 is configured to modify the applications 128 for at least two purposes. First, the applications 128 are modified to facilitate management, such as, for example, enabling or disabling application features, reporting application usage, enabling or disabling use of the application 128, facilitating use of single-sign-on enterprise credentials via the applications 128, encrypting a storage database on the client device 106, enforcing a geofence restriction, enforcing a time-based restriction, and so on. Second, the applications 128 are modified to facilitate coexistence with an unmanaged version of the application 128 on a client device 106, as it may be that two copies of the same application 128 may not be installed upon the client device 106. For example, certain operating systems may not allow installation of multiple copies of the same application 128. The application cloning service 126 may also be configured to receive application usage data 130 and to make decisions on whether to clone an application 128 based at least in part on the application usage data 130. As an example, applications 128 that are most frequently used during work hours may be targeted for cloning. As another example, applications 128 that are used at locations within a workplace may be targeted for cloning. Also, the application cloning service 126 may make cloning decisions based at least in part on results of application scanning, in order to assist in preventing malicious applications 128 from accessing enterprise data without the protection of a management wrapper.

The computing environment 103 may also execute other applications to facilitate interactions with a client device 106, such as an application distribution service that distributes applications and/or updates for applications to the client device 106, a mail server that provides email services and/or functionality, a document storage application that provides remote document storage capability for users of an enterprise, or other applications or services that an enterprise may deploy to provide services for its users.

The data stored in the data store 116 may include user data 132, client device data 133, compliance rules 134, managed clones of applications 127, application usage data 130, and/or other information. The user data 132 can include data associated with a user account, such as user profile information. User profile information can include information about a user's role within an organization, an office address or location, home address or location, permissions, and/or privileges with respect to usage of an enterprise device. For example, certain users in an enterprise may be classified differently from other users. In this regard, users may be assigned to various user groups within an enterprise. For example, a user group may specify a worker role within a company (e.g., sales, marketing, human resources, etc.), a division within a company, a geographic location or corporate office of a company, a labor category within a company (e.g., executives, contractors, etc.), or any other attribute by which users may be grouped within an enterprise. Additionally, users may be assigned to more than one user group within an enterprise.

User data 132 can also include access settings such as authentication credentials, delegation settings (e.g., information about other users who may be provided access to the user data 132 of a particular user), mail and document retention rules and/or policies, and/or other geographic access restrictions or limitations (e.g., information about certain locations and/or networks from which user data 132 can be accessed). In some cases, the user data 132 may specify a user type for whom application cloning is to apply and/or is to be exempted. User data 132 can also include information about a user account within the computing environment 103, which is referred to herein as an enterprise user account. For example, the enterprise user account may be associated with an email address or other identifier that is assigned by the computing environment 103, which may be separate or different from a personal email address or other identifier that a user may use for personal purposes. User data 132 may further include information about a user account that a user may have within the application distribution environment 109, which is an account that is external to the enterprise account. In many embodiments, information about the user account within the application distribution environment 109 may comprise a hash of the user's account identifier within the application distribution environment 109 or another identifier from which the user's account within the application distribution environment 109 can be identified.

User data 132 can also include other account settings, such as biographical or demographic information about a user, password reset information, multi-factor authentication settings, and other data related to a user account as can be appreciated. User data 132 can also include other forms of data associated with users of an enterprise's computing resources that are not shown, such as a user's mailbox data, calendar data, contact data, and information about the various devices, such as device identifiers, that are assigned to the user and managed in some form by the management console 123. For example, mailbox data includes data associated with one or more mailboxes corresponding to a user account of a user. The mailbox data can include electronic mail messages, mail folders into which messages are organized, filtering rules that are applied to incoming and/or outgoing mail messages, attachments associated with mail messages, and/or other data associated with a mailbox of a user. In one embodiment, the user data 132 may be accessed only via a managed clone 127 of an application 128.

The client device data 133 may include information regarding the client devices 106 that are managed by the device management system 119. For example, client device data 133 may include a device identifier that uniquely identifies one or more client devices 106 that are associated the user's account in the enterprise. Such client device data 133 for a particular client device 106 may also include, for example, the identification of the particular applications 128 that are installed in the client device 106, historical data regarding the operation of the client device 106, whether multiple copies of an application 128 are permitted to be installed, and/or other information.

In certain embodiments, a compliance rule 134 may specify a policy to which particular applications 128 and/or managed clones of applications 127 must adhere, which may be embodied within a compliance rule file. In some embodiments, an administrator may designate the policies that should be effectuated by a given compliance rule 134 via the management console 123. In some embodiments, a compliance rule 134 may include a pairing of at least one triggering condition and at least one remedial action, whose relationship is a "cause and effect" relationship such that upon the occurrence of a triggering condition a respective remedial action may be taken; that is, the triggering condition is the cause, and the remedial action is the effect of such cause.

In some embodiments, a compliance rule 134 may be enforced upon at least one feature of the client device 106 and/or at least one resource accessible to the client device 106 at startup and/or during run-time of the feature of the client device 106 or access to the resource. For instance, a compliance rule 134 associated with particular content (e.g., a portable document file (PDF) document) may be interpreted and enforced upon a request to access and/or otherwise use the content, and may be interpreted and enforced intermittently upon a time interval during access to and/or other usage of the content.

As described herein, a compliance rule 134 may include a triggering condition. In some embodiments, a triggering condition may include at least one of a request to perform at least one particular feature of the client device 106, a performance (e.g., partial, complete) of a particular feature of the client device 106, and/or a state of the client device 106. More specifically, the state of the client device 106 may include a plurality of characteristics describing the client device 106, such as at least one hardware feature enabled on the client device 106, at least one software feature enabled on the client device 106, at least one setting applied to the client device 106, at least one resource accessible to and/or stored by the client device 106, at least one geographic location of operation of the client device 106, and/or at least one time of operation of the client device 106. Additionally, the state of the client devices 106 may include a finite state that describes particular client devices 106 at a particular moment in time, or a comprehensive state that describes particular client devices 106 over a particular period of time. Consequently, a triggering condition may be defined as any undesirable state for the client device 106 to be in, which may include multiple criteria that may be evaluated over any configurable period of time. In another example, a triggering condition for a compliance rule 134 may be the user of a non-cloned, or native, application 128, where the use of a managed clone of the application 127 may be required.

Also as described herein, a compliance rule 134 may include a remedial action that may be paired with a triggering action. In certain embodiments, the remedial action may include at least one action that may be taken with respect to the client devices 106, which may be designated by an administrator of the client devices 106 (i.e., as a remedy to the triggering condition). In some embodiments, the remedial action may include the transmission to and/or enforcement of at least one procedure call at the client device 106. In some embodiments, the remedial action may include a transmission of information (e.g., at least one notification) regarding the triggering condition being present on the client device 106. The remedial action for a compliance rule 134 may include a series of actions. For example, the remedial actions may prevent access to a non-cloned, native application 128, perform cloning for the application 128, and then execute a managed clone of the application 127 as a replacement for the request to access the non-cloned, native application 128.

For instance, the notification may be transmitted to a user of the client device 106 (e.g., as a warning) that may specify that a particular triggering condition is currently present on the client device 106 and that further remedial actions may be taken with respect to the client device 106 if the triggering condition remains present on the client devices 106 after a particular threshold duration has expired (i.e., after a grace period for incompliance has expired). Additionally, the notification may be transmitted to an administrator of the client device 106 that specifies that a particular triggering condition is present on the client device 106. Furthermore, the notification may be transmitted to a device management system 119 that specifies that a particular triggering condition is present on the client device 106, which may be used by the device management system to update management records associated with the client device 106 to reflect the occurrence of the triggering condition on the client device 106.

The data store 116 may also store the managed clones of applications 127 that have been generated and are ready for deployment to client devices 106. In some cases, multiple managed clones 127 of a single application 128 may be created. For example, a managed clone 127 may be specific to a single user or a group of users. In some scenarios, different managed clones 127 may be associated with different management functionality and/or compliance rules 134.

The application usage data 130 may record statistics associated with usage of applications 128 by the client devices 106. Usage time, duration, location, bandwidth consumed, and/or other statistics relating to application usage may be recorded in the application usage data 130. For example, an analysis of the application usage data 130 may indicate that five client devices 106 out of ten client devices 106 in an organization are associated with at least five minutes use of a particular social networking application 128 during working hours. Thus, the application usage data 130 may be useful in identifying certain applications 128 for which managed clones 127 should be generated. Thus, in one embodiment, if the application usage data 130 indicates that a sufficient number of client devices 106 use an application 128 within a particular time period or at a particular location, then a managed clone 127 will be generated and installed upon all or some of the client devices 106 under management. Compliance rules 134 may then dictate that the managed clone 127 should be used in place of the application 128 during those hours, while within a workplace location, etc. Various thresholds and settings pertaining to these determinations may be established by an administrator via the management console 123.

The client device 106 is representative of multiple client devices that may be coupled to the network 113. The client device 106 may comprise, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display that comprises, for example, one or more devices such as liquid crystal display (LCD) displays, gas plasma-based flat panel displays, organic light emitting diode (OLED) displays, LCD projectors or other types of display devices.

The client device 106 may be configured to execute one or more applications 128, an agent application 135, and/or other components. An application 128 may comprise, for example, one or more programs that perform various operations when executed in the client device 106. Such an operation may comprise, for example, storing data, reading data, controlling a component for the client device 106, and/or other functionality. An application 128 may perform some operations by initiating functions that are performed by an operating system in the client device 106. An application 128 may initiate operating system functions by, for example, performing API calls.

An application 127 may be obtained via the application distribution environment 109 and/or the device management system 119. As noted above, a user may be associated with a first user account within the application distribution environment 109 and a separate user account within the computing environment 103, which can be operated by an enterprise that is separate from an entity operating the application distribution environment 109. Accordingly, an application 128 executed by the client device 106 can be obtained from the application distribution environment 109 using the first user account.

In addition to the applications 128, one or more managed clones of applications 127 may be installed upon the client device 106 as well. It may be that an application 128 and its corresponding managed clone 127 are installed on the same client device 106. Conversely, it may be that a managed clone 127 is installed on a client device 106, but its corresponding application 128 is not. Moreover, it may be that an application 128 is installed on a given client device 106, but its managed clone 127 is not.

The agent application 135 may be executed on the client device 106 to oversee, monitor, and/or manage at least a portion of the resources for the client device 106. The agent application 135 may be executed by the client device 106 automatically upon startup of the client device 106. Additionally, the agent application 135 may run as a background process in the client device 106. In other words, the agent application 135 may execute and/or run without user intervention. Additionally, the agent application 135 may communicate with the device management system 119 in order to facilitate the device management system 119 managing the client device 106. In particular, the agent application 135 may operate in conjunction with the managed clones of the application 127 to effectuate directives from the device management systems 119. For example, the agent application 135 may call management API functions of the managed clones of the application 127 to alter functionality, disable or enable features, and/or otherwise ensure compliance with the compliance rules 134.

The application distribution environment 109 may comprise, for example, a server computer or any other system providing computing capability. Alternatively, the application distribution environment 109 may employ multiple computing devices that may be arranged, for example, in one or more server banks, computer banks, or other arrangements. Such computing devices may be located in a single installation or may be distributed among many different geographical locations.

The application distribution environment 109 may provide an application repository 153 that stores various data related to the distribution and/or sale or application and other software via an electronic retail presence such as an online application store where applications 128 may be purchased, leased, or otherwise obtained by users. In one embodiment, the application repository 153 can store applications 128 and other data. The applications 128 may be made available for distribution to the client devices 106 under management by the device management system 119, but also to the client devices 106 that are not under management by the device management system 119.

Next, an additional description of the operation of the various components of the networked environment 100 is provided. To begin, users of client devices 106 may obtain applications 128 from the application repository 153 of the application distribution environment 109. The users may direct the installation of the applications 128 upon the client devices 106. The agent application 135 may report the usage of these applications 128 to the device management system 119. The device management system 119 may perform various processing on this usage data and ultimately store it as the application usage data 130 in the data store 116.

The application cloning service 126 is executed to determine applications 128 that are to be cloned for management according to the application usage data 130, a rule set that governs application cloning, and/or other data. For example, the application cloning service 126 may be configured to automatically clone applications 128 that are in use by at least a threshold percentage of client devices 106. The decision may also be made based at least in part on a time of day in which users of the client devices 106 are accessing the applications 128. For example, an application 128 that is being widely used during business hours of an enterprise may be a target for cloning. Also, an application 128 that is identified by an application scanning process as being potentially insecure or malicious may be targeted for cloning.

Upon determining an application 128 to be cloned, the application cloning service 126 receives a copy of the application 128. The application cloning service 126 may then perform various platform-specific actions in order to create a managed clone 127 of the application 128. Specifically, the application cloning service 126 may unpackage the application 128 and modify various binary code and/or metadata associated with the application 128. An object of this modification may be to change identifiers that would result in a conflict with installation of the unmodified application 128 as well as to make changes (e.g., insert API hooks) to facilitate management of the application 128.

Various identifiers that may need to be changed may include application name, package name, database name, account name, and so on. Each of these identifiers may be changed according to a predetermined manner or may be changed at least in part on a random basis. For example, a prefix or suffix may be added to the application name (e.g., "Text Messenger" may become "Text Messenger—MANAGED." In regard to package name, suppose that a package name for an application 128 is "com.application-source.application-name." A different package name that may be generated may correspond to "com.management-company-.com.application-source.application-name." Thus, the application 128 may be "repackaged" as the managed clone 127 having the different package name.

Upon generation of a managed clone 127, the managed clone 127 may be pushed out to and/or otherwise be made available for installation on the client devices 106. The compliance rules 134 may dictate that a managed clone 127 be used in place of the original application 128 in various circumstances. For example, the device management system 119 may require that a client device 106 use the managed clone 127 during a certain time period, while the client device 106 is inside (or outside) of a particular geofence, and so on. As used herein, the term "geofence" may indicate a particular defined area inside of which certain operations or features of the client devices 106 are permitted or denied, or outside of which certain operations or features of the client devices 106 are permitted or denied.

The device management system 119 may disable the use of one or more unmodified applications 128 according to compliance rules 134. As a non-limiting example, the device management system 119 may disable the use of a camera application 128 that is unmodified within a geofence corresponding to a restricted work area. Nonetheless, the device management system 119 may also enable the use of a managed clone 127 of the camera application 128 that facilitates taking pictures and sending them to a predefined data store of the enterprise.

Conversely, the device management system 119 may disable the use of one or more managed clones 127 according to criteria such as location relative to a geofence, the current time relative to a certain time period, and so on. As a non-limiting example, the organization may wish to disable use of a managed clone 127 that is configured for accessing an email account of the organization when the client device 106 is not within a geofence corresponding to a work location.

Figure 2:
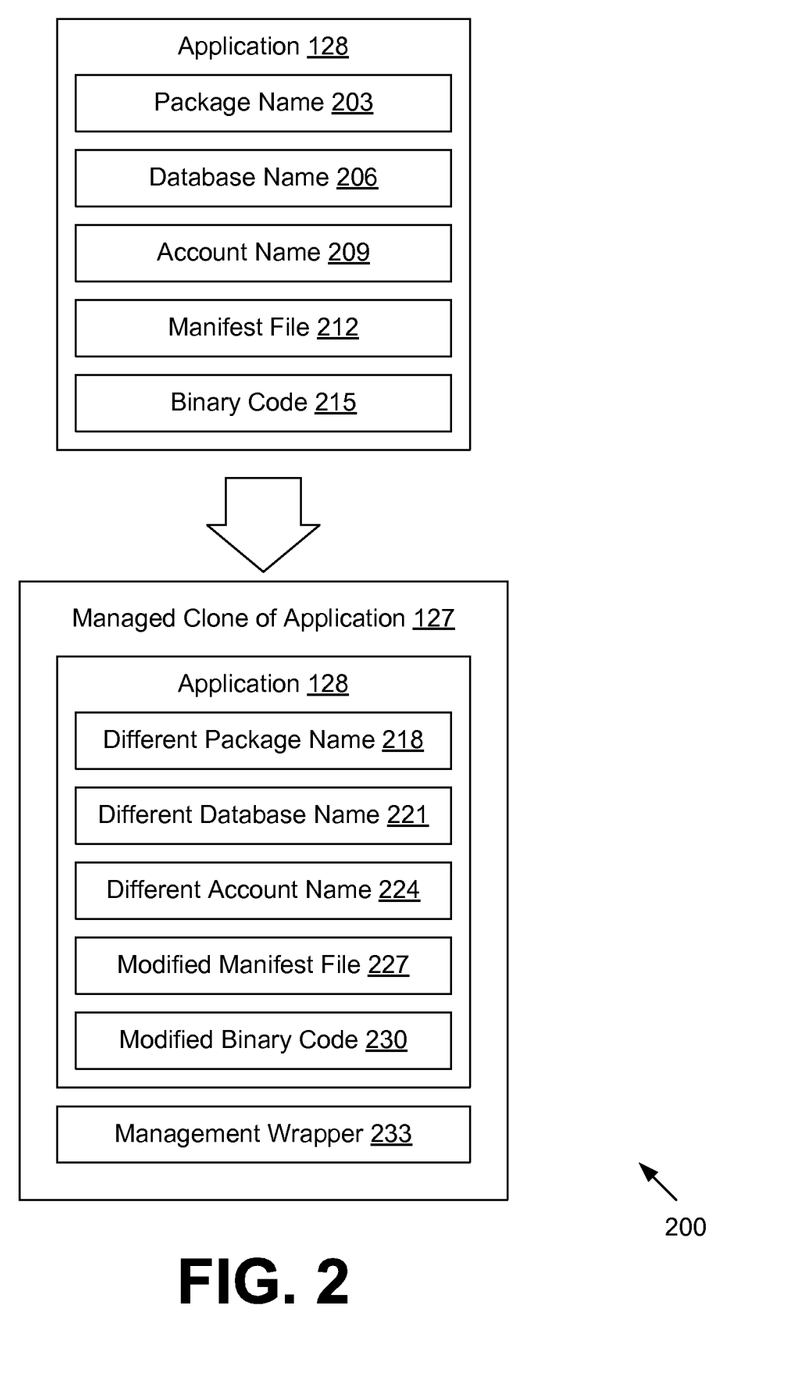
FIG. 2 is a data diagram of one example of the transformation performed by an application cloning service executed in a computing environment in the networked environment of FIG. 1 according to various embodiments of the present disclosure.

Moving now to FIG. 2, shown is a data diagram 200 of one example of the transformation performed by the application cloning service 126. In the data diagram 200, the application 128 is shown as including a package name 203, a database name 206, an account name 209, a manifest file 212, and binary code 215. In other examples, the application 128 may comprise different types of data and/or other data.

The package name 203 of the application 128 uniquely identifies a package that contains the application 128. The package name 203 may be required to be a globally unique identifier. For example, the package name 203 may be based at least in part on a domain name system (DNS) name to ensure uniqueness.

The database name 206 may correspond to a local database upon the client device 106 (FIG. 1) in which the application 128 stores application-related data. The database may also be a remote database within the computing environment 103 or other servers. In some cases, it may be possible to change the database location without changing the database name 206. The database name 206 may be unique with respect to the client device 106 and/or may be globally unique.

The account name 209 may correspond to an account used by the client device 106 to access resources on other computing devices via the network 113 (FIG. 1). For example, the account name 209 may identify an email account, a storage account, a social networking account, and/or other types of accounts. In various embodiments, the account name 209 may be required to be globally unique and/or locally unique within the client device 106.

The manifest file 212 may define metadata associated with the application 128. This metadata may include name of the application, package name 203, database name 206 and other database-specific information, account name 209 and other account-specific information, and other data. Where the application 128 corresponds to an ANDROID application, the manifest file 212 may correspond to the contents of "AndroidManifest.xml."

The binary code 215 may correspond to the code that implements the application 128. The binary code 215 may comprise compiled instructions for code originally written in JAVA, OBJECTIVE-C, and/or other programming languages. The binary code 215 may invoke a variety of APIs of the platform of the client device 106. The binary code 215 may include a text section that includes various API names and/or other identifiers that may need to be changed to facilitate application cloning.

The managed clone 127 of the application 128 may include a modified version of the application 128 previously described, with a different package name 218, a different database name 221, a different account name 224, a modified manifest file 227, and modified binary code 230. In addition, the managed clone 127 may include a management wrapper 233 that may be configured to enable or disable various features of the application 128 so as to implement directives from the agent application 135 (FIG. 1) and the device management system 119 (FIG. 1). The managed clone 127 may, for instance, force encryption of locally stored data, enable secure sockets layer (SSL) connections, disable hypertext transfer protocol (HTTP) connections, disable access to certain data in response to certain conditions, require biometric identification of the user, and so on.

Figure 3:
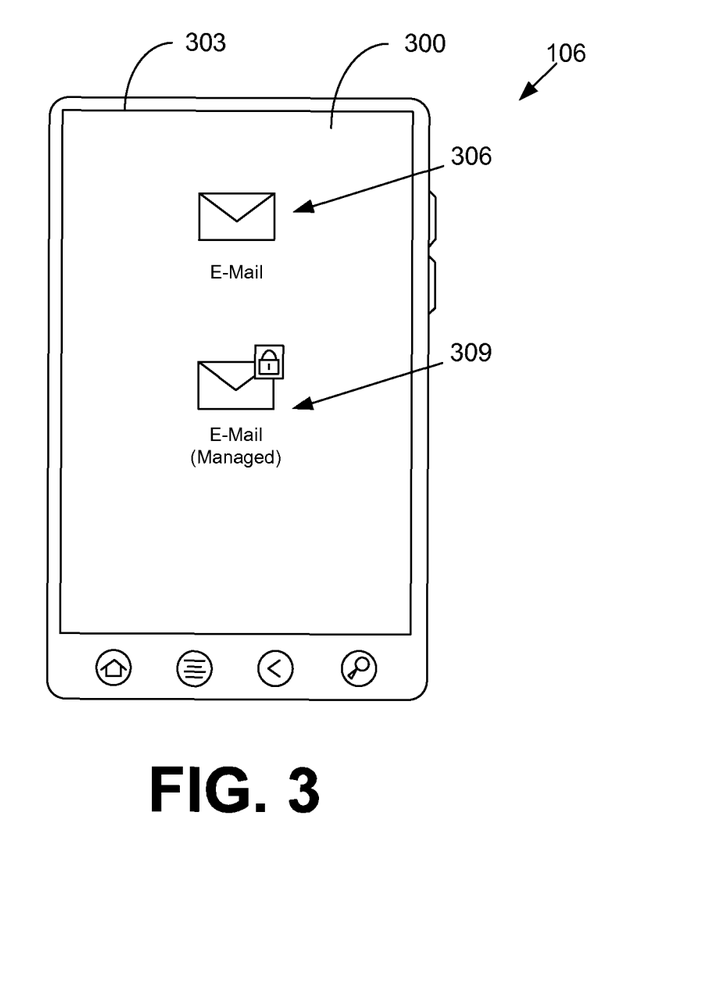
FIG. 3 is a pictorial diagram of an example user interface rendered by a client device in the networked environment of FIG. 1 according to various embodiments of the present disclosure.

Continuing to FIG. 3, shown is one example of a user interface 300 rendered upon a display 303 of a client device 106 according to various embodiments of the present disclosure. The user interface 300 may correspond to a home screen or another screen of the platform of the client device 106. The user interface 300 facilitates user selection from among multiple application icons. Specifically, in this non-limiting example, two icons are shown: icon 306 and icon 309. Icon 306 corresponds to an original, unmodified application 128 (FIG. 1) installed upon the client device 106, while icon 309 corresponds to a managed clone 127 (FIG. 1) installed upon the client device 106.

In this non-limiting example, the name of the application 128 is "E-Mail," while the name of the managed clone 127 is "E-Mail (Managed)." This illustrates one embodiment of the application cloning service 126 (FIG. 1), which generates a name for the managed clone 127 by concatenating the name of the application 128 (e.g., "E-Mail") with an identifier indicating management (e.g., "(Managed)"). In some cases, the name of the enterprise may be concatenated with the name of the application 128 (e.g., "Company-Z Email").

Additionally, the icon 309 differs from the icon 306 through the addition of a badge. A badge may be employed in order to differentiate the managed clone 127 from the application 128. In some cases, a badge may indicate specific restrictions or privileges that pertain to the managed clone 127 or the application 128. For example, a badge may be applied to the icon 306 to denote that the application 128 is restricted from use during work hours. In this example, the badge is a small lock icon superimposed upon the icon 306 at the upper left corner. It is noted that badges may take many different shapes and forms. In other examples, the icon 306 may be transformed into the icon 309 by other approaches (e.g., changing the color, rotating, inverting, etc.). In still other examples, an icon 309 that is completely different from the icon 306 may be used for the managed clone 127.

In another embodiment, a single icon 306 may be employed to select either the original application 128 or the managed clone 127. A type of user selection (i.e., gesture) applied relative to the icon 306 may result in launching either the original application 128 or the managed clone 127. For example, a short press may be used to select the original application 128, while a long press may be used to select the managed clone 127. In another example, a selection of the icon 306 may cause either the original application 128 or the managed clone 127 to be launched, depending on the context and any applicable compliance rules 134 (FIG. 1) enforced by the agent application 135 (FIG. 1). For example, if it is detected that the client device 106 is being used by an employee at work, the managed clone 127 may be launched. By contrast, if it is detected that the client device 106 is not being used by the employee at work, the original application 128 may be launched.

Figure 4:
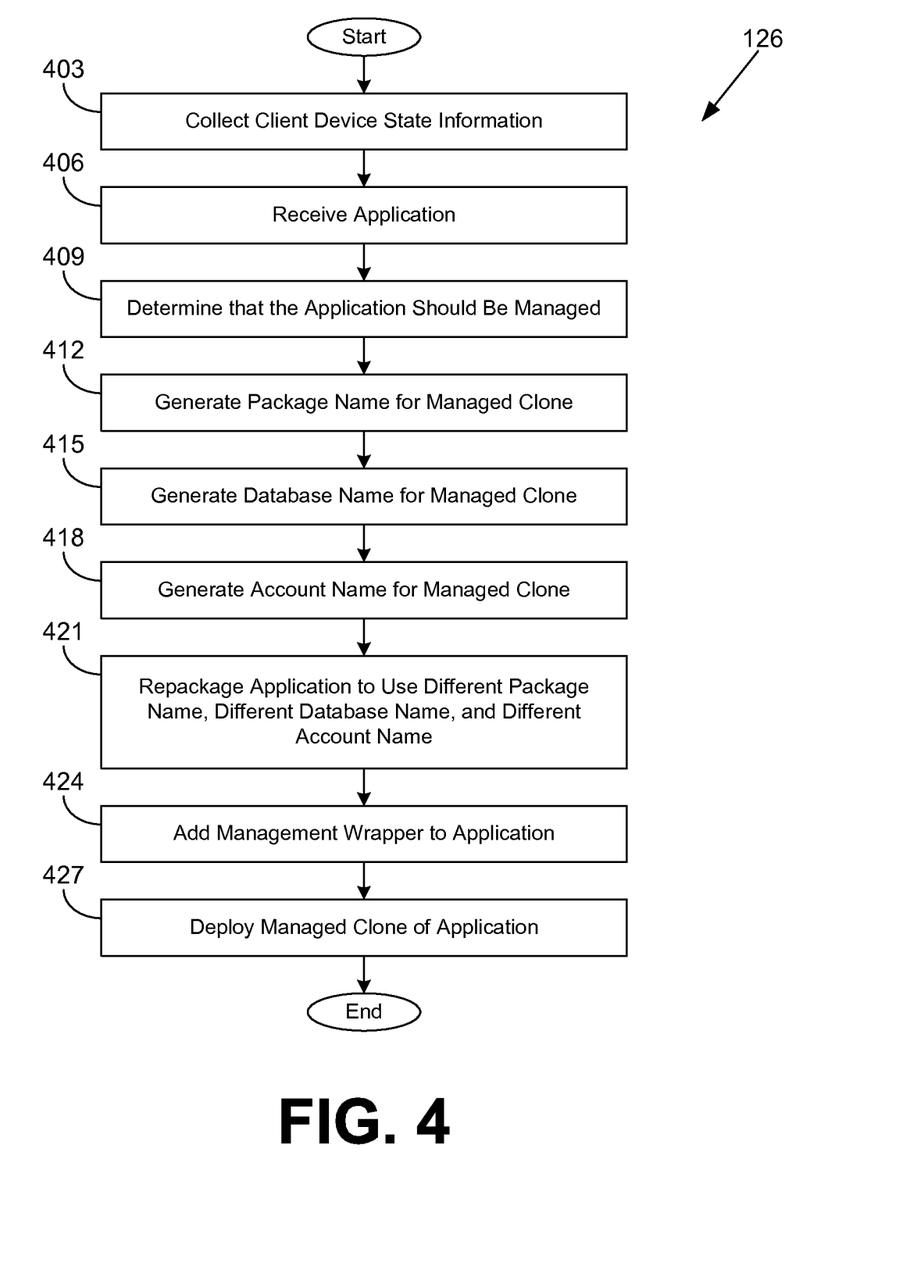
FIG. 4 is a flowchart illustrating one example of functionality implemented as portions of an application cloning service executed in a computing environment in the networked environment of FIG. 1 according to various embodiments of the present disclosure.

Referring next to FIG. 4, shown is a flowchart that provides one example of the operation of a portion of the application cloning service 126 according to various embodiments. It is understood that the flowchart of FIG. 4 provides merely an example of the many different types of functional arrangements that may be employed to implement the operation of the portion of the application cloning service 126 as described herein. As an alternative, the flowchart of FIG. 4 may be viewed as depicting an example of elements of a method implemented in the computing environment 103 (FIG. 1) according to one or more embodiments.

Beginning with box 403, the application cloning service 126 may collect client device state information such as application usage data 130 (FIG. 1). The application usage data 130 includes various statistics about the usage of applications 128 (FIG. 1) by client devices 106 (FIG. 1) associated with an organization. The application usage data 130 and other client device state information may be gathered in conjunction with the device management system 119 (FIG. 1) and the agent application 135 (FIG. 1). In one scenario, client device state information may be employed to identify "jailbroken" client devices 106. It may be decided, based upon a compliance rule 134 (FIG. 1), that no non-cloned application 128 may be used upon jailbroken client devices 106. The compliance rule 134 may prompt a cloning process to begin for all applications 128 resident upon the client device 106. To this end, an agent application 135 may notify a device management system 119 of the applications 128 that are resident upon the client device 106. In box 406, the application cloning service 126 receives an application 128. For example, the application cloning service 126 may download the application 128 from an application distribution environment 109 (FIG. 1) over a network 113 (FIG. 1).

In box 409, the application cloning service 126 determines that the application 128 should be managed. This determination may be a manual determination, and a system administrator may manually indicate that a particular application 128 should be managed. Alternatively, the determination may be automatic based at least in part on a comparison of the application usage data 130 with management selection criteria, such as time of use, volume of use, and/or other criteria. To make this determination, a compliance rule 134 may be evaluated using state information associated with the client device 106, a feature of the application 128, an identification of data accessed by the application 128 (e.g., data repositories accessed by the application 128), and/or other information.

In box 412, the application cloning service 126 generates a different package name 218 (FIG. 2) to replace the package name 203 (FIG. 2) of the application 128. In box 415, the application cloning service 126 generates a different database name 221 (FIG. 2) to replace the database name 206 (FIG. 2) of the application 128. In box 418, the application cloning service 126 generates a different account name 224 (FIG. 2) to replace the account name 209 (FIG. 2) of the application 128.

In box 421, the application cloning service 126 repackages the application 128 to use the different package name 218, the different database name 221, and the different account name 224. For example, the application cloning service 126 may unpack the application 128 and make various changes to the binary code (FIG. 2), the manifest file 212 (FIG. 2), and/or other data of the application 128.

In box 424, the application cloning service 126 adds a management wrapper 233 (FIG. 2) to the application 128 to implement management functions. For example, the manifest file 212 and/or the binary code 215 may be modified to hook in an application programming interface (API) that provides management functions (e.g., to enable/disable application features, to facilitate logging of usage, and/or other management functions). In some cases, the application 128 may be modified to exclude a particular feature. Also, the application 128 may be configured to remove application data in response to receiving a remote wipe instruction from the device management system 119.

The managed clone 127 is thus configured for coexistence with the application 128 upon a client device 106 upon which the application 128 has already been installed. In box 427, the application cloning service 126 proceeds to deploy the managed clone 127 (FIG. 1) of the application 128 containing the modified manifest file 227 (FIG. 2) and the modified binary code 230 (FIG. 2) to one or more client devices 106 under management by the device management system 119. For example, the application cloning service 126 may make the managed clone 127 available for users of client devices 106 to select and download through an application distribution environment 109. Alternatively, the managed clone 127 may be pushed automatically to the client device 106. In one embodiment, the application cloning service 126 may be local to the client device 106, and the application cloning service 126 may generate the managed clone 127 locally. For example, the application cloning service 126 may be bundled with the agent application 135. The managed clone 127 is modified from the application 128 so that the managed clone 127 can coexist with the application 128 upon the client device 106. Thereafter, the operation of the application cloning service 126 ends.

Figure 5:
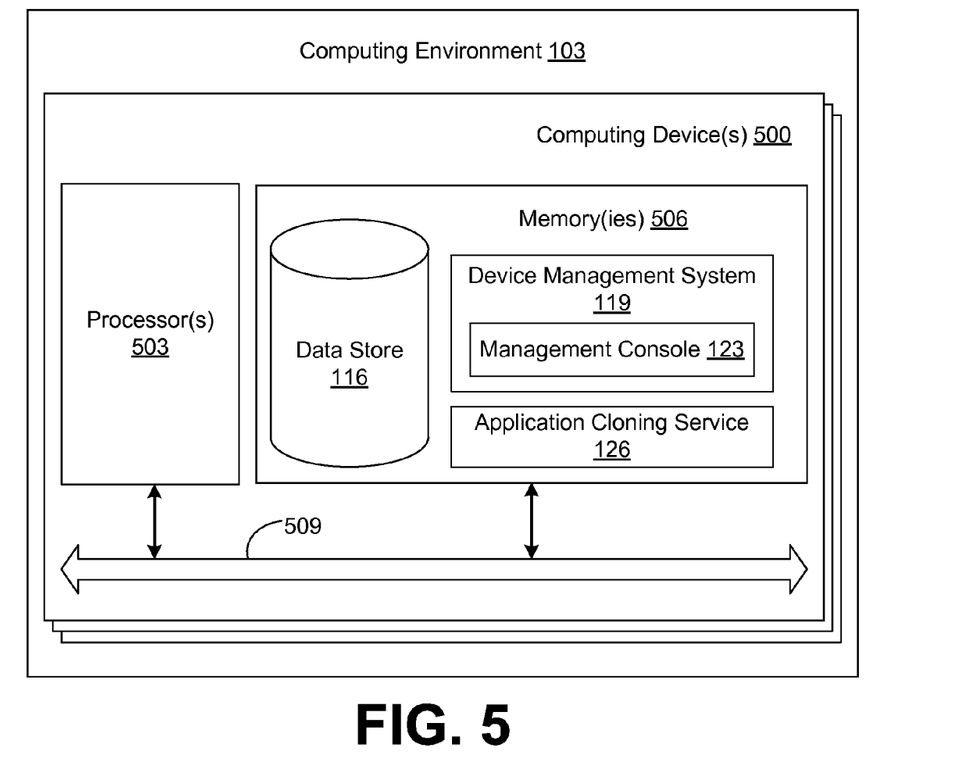
FIG. 5 is a schematic block diagram that provides one example illustration of a computing environment employed in the networked environment of FIG. 1 according to various embodiments of the present disclosure.
Figure 6:
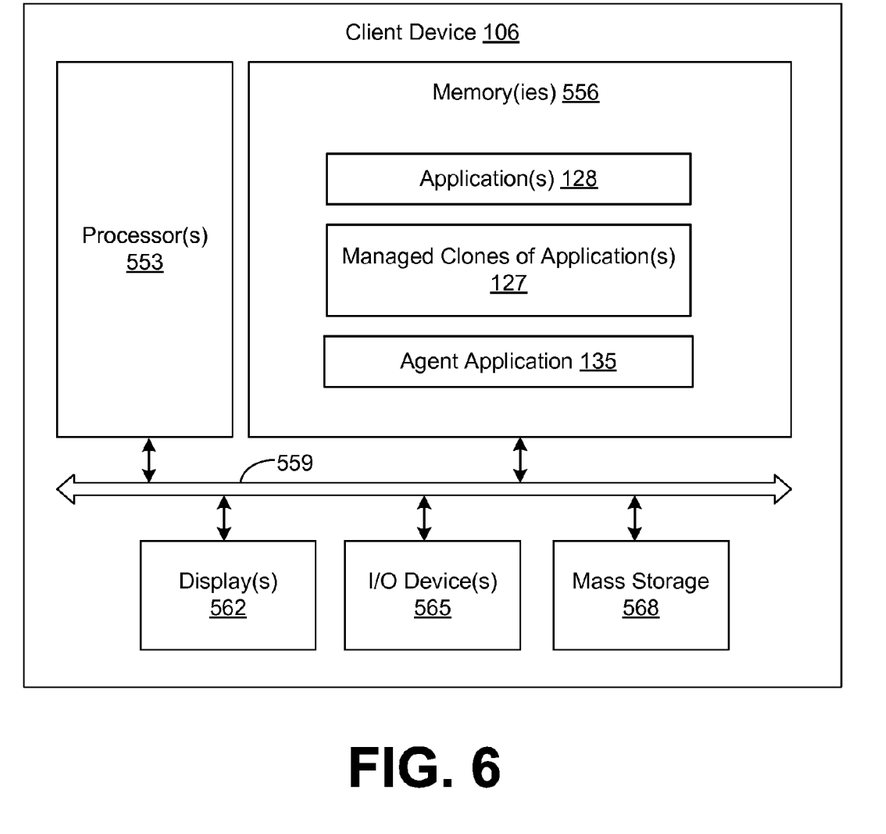
FIG. 6 is a schematic block diagram that provides one example illustration of a client device employed in the networked environment of FIG. 1 according to various embodiments of the present disclosure.

With reference to FIGS. 5 and 6, shown are schematic block diagrams of the computing environment 103 and client device 106 according to an embodiment of the present disclosure. The computing environment 103 includes one or more computing devices 500. Each computing device 500 and/or client device 106 includes at least one processor circuit, for example, having a processor 503, 553 and a memory 506, 556, both of which are coupled to a local interface 509, 509, respectively. As such, each computing device 500 may comprise, for example, at least one server computer or like device. A client device 106 may comprise a mobile device, smartphone, computing device, or like device. The local interface 509, 559 may comprise, for example, a data bus with an accompanying address/control bus or other bus structure as can be appreciated.

Stored in the memory 506, 556 are both data and several components that are executable by the processor 503, 553. In particular, stored in the memory 506 and executable by the processor 503 are a device management system 119, a management console 123, an application cloning service 126, and potentially other applications. Also stored in the memory 506 may be a data store 116 and other data. In addition, an operating system may be stored in the memory 506 and executable by the processor 503. Stored in the memory 556 and executable by the processor 553 are applications 128, managed clones 127 of applications 128, an agent application 135, and potentially other applications.

It is understood that there may be other applications that are stored in the memory 506, 556 and are executable by the processor 503, 553 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506, 556 and are executable by the processor 503, 553. In this respect, the term "executable" means a program file that is in a form that can ultimately be run by the processor 503, 553. Examples of executable programs may be, for example, a compiled program that can be translated into machine code in a format that can be loaded into a random access portion of the memory 506, 556 and run by the processor 503, 553, source code that may be expressed in proper format such as object code that is capable of being loaded into a random access portion of the memory 506, 556 and executed by the processor 503, 553, or source code that may be interpreted by another executable program to generate instructions in a random access portion of the memory 506, 556 to be executed by the processor 503, 553, etc. An executable program may be stored in any portion or component of the memory 506, 556 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506, 556 is defined herein as including both volatile and nonvolatile memory and data storage components. Volatile components are those that do not retain data values upon loss of power. Nonvolatile components are those that retain data upon a loss of power. Thus, the memory 506, 556 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503, 553 may represent multiple processors 503, 553 and/or multiple processor cores and the memory 506, 556 may represent multiple memories 506, 556 that operate in parallel processing circuits, respectively. In such a case, the local interface 509, 509 may be an appropriate network that facilitates communication between any two of the multiple processors 503, 553, between any processor 503, 553 and any of the memories 506, 556, or between any two of the memories 506, 556, etc. The local interface 509, 509 may comprise additional systems designed to coordinate this communication, including, for example, performing load balancing. The processor 503, 553 may be of electrical or of some other available construction.

The client device 106 may include a display 562 that comprises, for example, one or more devices such as liquid crystal display (LCD) displays, gas plasma-based flat panel displays, organic light emitting diode (OLED) displays, LCD projectors, or other types of display devices, etc. The client device 106 may also include one or more input/output devices 565 that may include, for example, a capacitive touchscreen or other type of touch input device, fingerprint reader, keyboard, etc. Additionally, the client device 106 may also include some form of mass storage 568, which can comprise a hard drive, flash memory, or other storage devices.

Although the device management system 119, the management console 123, the application cloning service 126, the applications 128, the managed clones 127, the agent application 135, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows an example of the functionality and operation of an implementation of portions of the application cloning service 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the device management system 119, the management console 123, the application cloning service 126, the applications 128, the managed clones 127, and the agent application 135, that comprises software or code can be embodied in any non-transitory computer-readable medium for use by or in connection with an instruction execution system such as, for example, a processor 503, 553 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the device management system 119, the management console 123, the application cloning service 126, the applications 128, the managed clones 127, the agent application 135, etc., may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500 and/or client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
   code that receives an application, the application being publicly available via an application distribution environment;
   code that generates a managed clone of the application by at least:
      generating a different package name for the managed clone of the application, the different package name differing from an original package name of the application;
      adding a management wrapper to the application to enforce a restriction; and
      repackaging the application to use the different package name;
   code that deploys the managed clone of the application to a mobile client device;
   code that instructs the mobile client device executing a single mobile operating system to install the managed clone of the application on the single mobile operating system, without uninstalling the application from the single mobile operating system; and
   code that instructs the mobile client device on when to switch between executing the application and the managed clone of the application based on one or more compliance rules established remotely by an administrator and provided to the mobile client device.

2. The non-transitory computer-readable medium of claim 1, wherein the code that generates the managed clone of the application further comprises:
   code that generates a different database name for the managed clone of the application, the different database name differing from an original database name of the application, wherein the application is repackaged to use the different database name; and
   code that generates a different account name for the managed clone of the application, the different account name differing from an original account name of the application, wherein the application is repackaged to use the different account name.

3. The non-transitory computer-readable medium of claim 1, wherein the code that generates the managed clone of the application further comprises:
   code that modifies a manifest file of the application; and
   code that modifies binary code of the application.

4. The non-transitory computer-readable medium of claim 1, further comprising code that determines whether to create the managed clone of the application based at least in part on application usage data associated with a plurality of users in an organization.

5. A method, comprising:
   receiving an application, the application being publicly available via an application distribution environment;
   generating a managed clone of the application by at least:
      generating a different package name for the managed clone of the application, the different package name differing from an original package name of the application;
      adding a management wrapper to the application to enforce a restriction; and
      repackaging the application to use the different package name;
   deploying the managed clone of the application to a mobile client device;
   instructing the mobile client device executing a single mobile operating system to install the managed clone of the application on the single mobile operating system, without uninstalling the application from the single mobile operating system; and
   instructing the mobile client device on when to switch between executing the application and the managed clone of the application based on one or more compliance rules established remotely by an administrator and provided to the mobile client device.

6. The method of claim 5, wherein generating the managed clone of the application further comprises:
generating a different database name for the managed clone of the application, the different database name differing from an original database name of the application, wherein the application is repackaged to use the different database name; and
generating a different account name for the managed clone of the application, the different account name differing from an original account name of the application, wherein the application is repackaged to use the different account name.

7. The method of claim 5, wherein generating the managed clone of the application further comprises:
modifying a manifest file of the application; and
modifying binary code of the application.

8. The method of claim 5, further comprising determining whether to create the managed clone of the application based at least in part on application usage data associated with a plurality of users in an organization.

9. A system comprising a processor and a memory, the system being configured to at least:
receive, using the processor and the memory, an application, the application being publicly available via an application distribution environment;
generate, using the processor and the memory, a managed clone of the application by at least:
generating, using the processor and the memory, a different package name for the managed clone of the application, the different package name differing from an original package name of the application;
adding, using the processor and the memory, a management wrapper to the application to enforce a restriction; and
repackaging, using the processor and the memory, the application to use the different package name;
deploy, using the processor and the memory, the managed clone of the application to a mobile client device;
instruct the mobile client device executing a single mobile operating system to install the managed clone of the application on the single mobile operating system, without uninstalling the application from the single mobile operating system; and
instruct the mobile client device on when to switch between executing the application and the managed clone of the application based on one or more compliance rules established remotely by an administrator and provided to the mobile client device.

10. The system of claim 9, wherein the processor and the memory are further configured to:
generate a different database name for the managed clone of the application, the different database name differing from an original database name of the application, wherein the application is repackaged to use the different database name; and
generate a different account name for the managed clone of the application, the different account name differing from an original account name of the application, wherein the application is repackaged to use the different account name.

11. The system of claim 9, wherein the processor and the memory are further configured to:
modify a manifest file of the application; and
modify binary code of the application.

12. The system of claim 11, where the processor and the memory are further configured to determine whether to create the managed clone of the application based at least in part on application usage data associated with a plurality of users in an organization.

* * * * *